C. F. GAILOR.
RAIL JOINT.
APPLICATION FILED DEC. 13, 1912.

1,070,444.

Patented Aug. 19, 1913.

WITNESSES

INVENTOR
Chester F. Gailor
BY
ATTORNEY

UNITED STATES PATENT OFFICE.

CHESTER F. GAILOR, OF HARTFORD, CONNECTICUT.

RAIL-JOINT.

1,070,444.   Specification of Letters Patent.   Patented Aug. 19, 1913.

Application filed December 13, 1912. Serial No. 736,500.

*To all whom it may concern:*

Be it known that I, CHESTER F. GAILOR, a citizen of the United States, and a resident of Hartford, in the county of Hartford and State of Connecticut, have invented certain new and useful Improvements in Rail-Joints, of which the following is a specification.

This invention relates to improvements in rail joints, and is particularly well adapted for use in connection with the rail joint shown and described in United States Patent No. 930,066, dated August 3d, 1909, which joint is especially intended for electric railway uses.

The particular object of the invention is to produce a fastening device for the abutting ends of rails to insure a permanent structure in which the strain incident to the expansion and contraction of the rails and the usual distortion to which the rails are subjected in ordinary use may be evenly distributed through the several parts constituting the joint, and the present invention relates more particularly to means for so uniting the parts that the complete joint is what may be termed an integral structure.

The invention consists in drawing the abutting ends of the rails into close contact with each other by bolting or riveting to the sides of the rails splicing plates familiarly known in the art as fish plates, and welding one or both heads of the rivets or bolts, either of which devices is comprehended by the term "fastener", which will be hereinafter used, to a surface with which it contacts. That is to say, that in the case of a bolt, the nut, after it is screwed home, may be welded either to the bolt or to the fish plate, or to both, and the head of the bolt may also be welded to the fish plate at the other side of the rails; or in the case of a rivet, either or both of the heads may be welded to the fish plates. In addition, and as a preferred construction, the fish plates are also welded to the rails as set forth in my former patent above referred to, in which case it will be seen that the complete joint is an integral structure, the fish plates being welded to the rail ends and the fasteners being welded to the fish plates, preventing any relative motion between the parts, preventing the jar from loosening the nuts of the bolts when the fastener is of that form, and preventing the rivets from turning or moving when the fastener takes that form. The result is an even distribution of strain through all parts of the joint, this result being accomplished in large part by the integral nature of the structure which insures a perfect joint of long life with each member taking and supporting its part of the strain.

Figure 3:
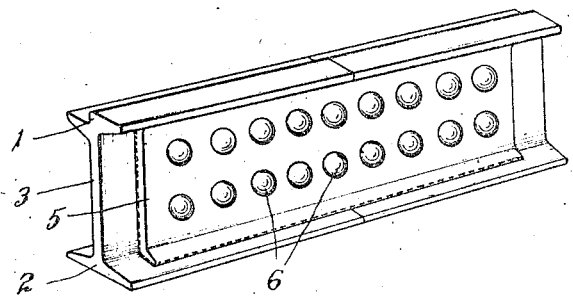
Figure 1:
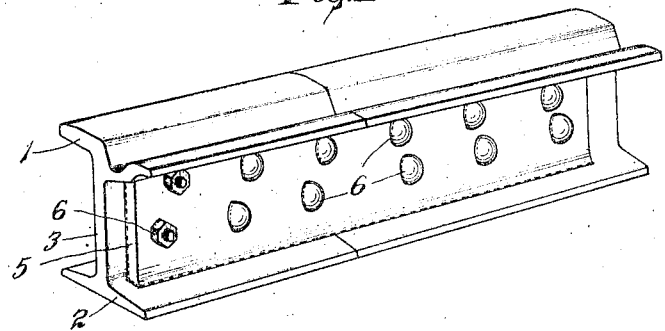
Figure 2:
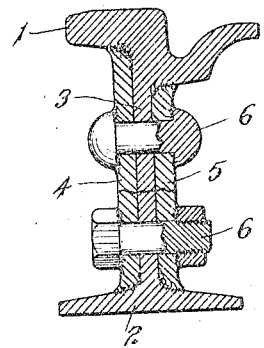

The invention is illustrated in the drawings—Figure 1 being a perspective view of a completed joint and Fig. 2, a cross section through the joint taken at the ends of the abutting rails. Fig. 3 shows a modification.

The type of rail used may vary largely, but every rail comprises a head 1 and a base 2, united by the vertical web 3. The fish plates 4, 5, fit alongside of the vertical web 3, with their edges contacting with the underside of the head and the upper side of the base, as clearly seen in the drawings. If desired, these fish plates can be provided with lateral edge flanges as seen in Fig. 3, which would give a greater surface area of contact. The fish plates are secured to the rails at either side of the vertical web 3, so as to lap the joint of the abutting ends of the rails, and are secured in place by fasteners 6, either bolts or rivets, the former being used usually, which pass through apertures in the plates and the vertical web. These holes are carefully bored to register with each other when the abutting ends of the walls are tight together, and a slight strain tending to draw the ends of the rails together can be established by having the holes in the vertical webs very slightly out of alinement with the holes in the fish plates, the fish plates being heated to expand them so as to bring the holes into alinement, at which time the fasteners are passed through the holes and secured in place. It will thus be seen that when the fish plates cool and contract they draw on the fasteners, and a strain is produced tending to hold the ends of the rails together. If desired, the upper and lower edges of the fish plates may be welded to the head and base of the rail.

After the fasteners have been driven home, either by riveting over one end of the rivet, or by turning up the nut on the bolt to securely clamp the fish plates to the rail, one or both of the heads of each fastener are welded to an abutting contacting surface. In the case of the rivet, the weld would be between the head of the rivet and the side of the fish plate. In the case of the bolt, the weld would occur either between the nut and the bolt or the nut and the fish plate, and if desired between the head of the bolt and the fish plate with which it contacts. This prevents any possible disengagement of the nut from the bolt, and so insures that each bolt continuously carries its part of the strain. This additional step in the construction of a complete rail joint, and especially one designed for electric railway uses, constitutes an important advance in the art, in that it insures the maintenance of other parts of the joint structure to the greatest possible degree by relieving them from undue strain, which would be caused by the failure of any single element of the joint.

I claim as my invention:

1. That improvement in the art of uniting rails and fish plates which consists in placing the rails end to end, in alinement with each other, locating fish plates at the sides of the rails and to overlap the ends thereof, securing said fish plates to said rails by headed fasteners, and welding a head of each fastener to a contacting surface.

2. That improvement in the art of uniting rails and fish plates which consists in placing the rails end to end, in alinement with each other, locating fish plates at the sides of the rails and to overlap the ends thereof, passing headed bolts through the fish plates and rail ends, and drawing the parts together by nuts on the bolts, and finally in welding said nuts to a surface with which they contact.

3. That improvement in the art of uniting rails and fish plates which consists in placing the rails end to end, in alinement with each other, locating fish plates at the sides of the rails and to overlap the ends thereof, passing headed bolts through the fish plates and rail ends, and drawing the parts together by nuts on the bolts, and finally in welding the nuts to the bolts.

4. That improvement in the art of uniting rails and fish plates which consists in placing the rails end to end, in alinement with each other, locating fish plates at the sides of the rails and to overlap the ends thereof, passing headed bolts through the fish plates and rail ends, and drawing the parts together by nuts on the bolts, and finally in welding said nuts to the bolts and to the fish plates.

CHESTER F. GAILOR.

Witnesses:
ANNE E. O'BRIEN,
H. C. REED.